Aug. 1, 1961     D. R. LEVERING     2,994,583
PREPARATION OF METAL AZIDES
Filed Dec. 31, 1956
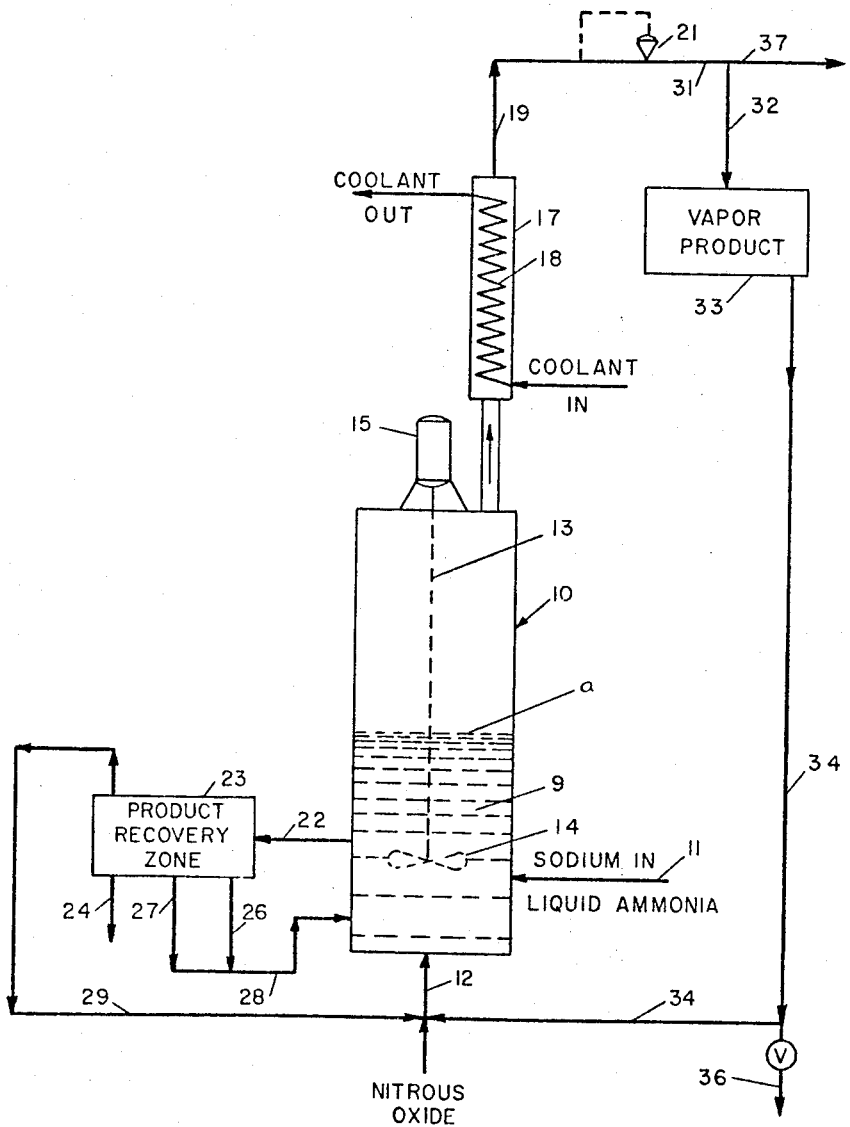
DEWEY R. LEVERING
INVENTOR.
BY Ernest G. Peterson
AGENT

United States Patent Office 2,994,583
Patented Aug. 1, 1961

2,994,583
PREPARATION OF METAL AZIDES
Dewey R. Levering, Wilmington, Del., assignor to Hercules Powder Company, Wilmington, Del., a corporation of Delaware
Filed Dec. 31, 1956, Ser. No. 631,893
14 Claims. (Cl. 23—101)

This invention relates to the manufacture of azides. In one aspect this invention relates to a one-step process for the manufacture of alkali metal azides by reacting ammonia, alkali metal, and nitrous oxide in a single reaction step. In still another aspect this invention relates to the production of alkali metal azides in higher yields than obtained heretofore, in a single step, by the interaction of ammonia, alkali metal and nitrous oxide and removal of hydrogen from the reaction zone during the azide-forming reaction. In still another aspect this invention relates to a one-step continuous flow-type process for the manufacture of alkali metal azides from ammonia, nitrous acid and an alkali metal.

Alkali metal azides are important as chemical intermediates in the manufacture of blowing agents, caprolactam, isocyanates and the like. The alkali metal azides have been produced commercially from ammonia, alkali metal and nitrous oxide in two steps involving forming an alkali metal amide in a first step by reaction of sodium and ammonia and reacting the amide thus formed with nitrous oxide in a second step to form the azide.

In one such two-stage process ammonia is charged into a melt of metallic alkali metal at about 300° C. to form sodium amide and hydrogen. The resulting reaction mixture is then fed into a reaction mill together with the nitrous oxide, wherein the nitrous oxide and amide are reacted at 180 to 200° C. to form the corresponding azide. That process, in addition to its being time consuming in respect of the time required for two steps, requires in the order of 8 to 10 hours for initial formation of the amide, the ammonia being substantially unreacted during a major portion of the reaction period, e.g., about ¾ of the reaction period being required for forming the first 50 percent of the amide. The above two-stage process has been improved by forming the amide in the first step while maintaining a feasible concentration of amide product in contact with the reacting alkali metal and ammonia. Although the improved process requires less time than had theretofore been required, it nevertheless requires two separate process steps, namely, an amide-forming step and a subsequent reaction step with nitrous oxide to form the azide. Further, maintaining the reactants and reacting mixture at such a high temperature is not only undesirable from the standpoint of toxicity of those materials but is hazardous in that the azide is easily detonatable under those conditions.

Another process for the manufacture of alkali metal azides, although involving two steps, has been carried out at lower temperatures. In that process the alkali metal is reacted with anhydrous ammonia to form the amide, and nitrous oxide gas is contacted with the anhydrous liquid mixture containing the alkali metal amide which is a reaction product of the alkali metal and ammonia. Nevertheless, two separate process steps are required.

A one-step process in the art for the production of alkali metal azides introduces all reactants into a single reaction zone, e.g., by forming a solution of sodium and ammonia and pressing nitrous oxide directly into the said solution, the temperatures being in the order of about room temperature. The reaction involves the formation of an amide through which the azide formation proceeds, and requires 4 moles of alkali metal for each mole of alkali metal azide product, permitting thereby a maximum yield of 25 mol. percent based on the alkali metal.

This invention is concerned with the interaction of ammonia, alkali metal and nitrous oxide in a single process step at temperatures approximating room temperature and lower, when desired, to achieve product yields markedly higher than those of the one-step operation of the prior art, while eliminating the time loss incurred heretofore in two-stage operation.

An object of this invention is to provide for the manufacture of alkali metal azides. Another object is to provide a one-step process for the production of alkali metal azides from ammonia, alkali metal and nitrous oxide. Another object is to provide a one-step process for the production of alkali metal azides in markedly higher yields than obtained in single-step operation heretofore. Another object is to provide for production of alkali metal azides without passing through an intermediate amide formation step. Another object is to provide for the manufacture of alkali metal azides without the occurrence of side reactions that result in a substantial lowering of azide product yield. Other aspects and objects will be apparent in light of the accompanying disclosure and the appended claims.

In accordance with this invention an improvement is provided in the manufacture of alkali metal azides from ammonia, alkali metal and nitrous oxide which comprises reacting said ammonia, alkali metal and nitrous oxide in a single reaction step to form the alkali metal azide and withdrawing hydrogen from the zone of resulting reaction during at least a portion of said reaction, whereby azide product yields higher than those obtained heretofore in a single process step are achieved.

My invention is illustrated with reference to the following examples.

*Example 1*

A 500-ml. stainless steel rocking type autoclave was charged with 11.5 g. (0.5 mole) of clean dry sodium. The autoclave was capped, sealed, cooled in Dry Ice and evacuated. Liquid ammonia, 100 g. (5.9 moles), was weighed in and the bomb placed in a jacket through which a liquid was circulated. The temperature was raised to 45° C. and nitrous oxide was added in increments over a period of 2.5 hours maintaining the temperature at 45 to 50° C. All of the gas was removed after 0.5 hour of reaction and found to contain 0.13 mole of hydrogen. Reaction was continued with fresh nitrous oxide. When no further gas absorption occurred the reactor was cooled to 20° C., vented and the product removed. Ninety-eight percent of the sodium was recovered as sodium azide (0.19 mole) and sodium hydroxide (0.302 mole). The conversion to sodium azide was 38 percent. The gas at the end of the reaction contained only a small amount of hydrogen; it was mainly nitrous oxide.

*Example 2*

A 500 ml. stainless steel rocking type autoclave was charged with 11.5 g. (0.5 mole) of clean dry sodium. The autoclave was capped, sealed, cooled in Dry Ice and evacuated. Liquid of ammonia, 120 g. (7.05 moles), was weighed in and the bomb was placed in a jacket through which a liquid was circulated for heating or cooling purposes. The temperature of the autoclave was raised to 10° C. and nitrous oxide was added in increments over a period of 30 minutes maintaining the temperature at 12 to 14° C. At the end of that time the gas was sampled and the reactor vented. The resulting white solid was dissolved in water and the solution analyzed. Ninety-eight percent of the sodium was recovered as sodium azide (0.14 mole) and sodium hydroxide (0.35 mole). The conversion of sodium to sodium azide was 28 percent. The gas contained 0.102 mole of hydrogen and 0.045 g. of nitrogen.

Example 3

A 500-ml. stainless steel rocking type autoclave was charged with 11.5 g. (0.5 mole) of clean dry sodium. The autoclave was capped, sealed, cooled in Dry Ice and evacuated. Liquid ammonia, 65 g. (3.80 moles), was weighed in and the bomb placed in a jacket through which a liquid was circulated. The temperature was raised to 25° C. and nitrous oxide was added in increments over a period of four hours, maintaining the temperature at 25 to 30° C. All of the gas was removed after 1.8 hours of reaction and found to contain 0.043 mol of hydrogen. Reaction was continued with fresh nitrous oxide. When no further gas absorption occurred the reactor was cooled to 20° C., vented and the product removed. The conversion of sodium to sodium azide was 28 per cent (0.14 mole). At the end of the reaction the gas contained only very small amounts of hydrogen; it was mainly nitrous oxide.

The following tabulation is a summary of data from the foregoing Examples 1 to 3.

| Example | Mols Sodium | Mols Ammonia | Withdrawal of Hydrogen | Remaining Reaction Period, Hrs. | Temp., °C. | Yield[1] of NaN$_3$ | Off-Gas Mols H$_2$ | Off-Gas Yield[1] of H$_2$ |
|---|---|---|---|---|---|---|---|---|
| 1 | 0.5 | 5.9 | After 0.5 hr | 2.0 | 45–50 | 38 | 0.13 | 26 |
| 2 | 0.5 | 7.0 | After 0.5 hr | 0 | 12–14 | 28 | 0.102 | 20 |
| 3 | 0.5 | 3.8 | After 1.8 hr | | 25–30 | 28 | 0.043 | 8.6 |

[1] Yield based on sodium.

Example 1 shows a yield of sodium azide of 38 mol percent that has been obtained by withdrawal of all hydrogen from the system after ½ hour and then carrying on further reaction for 2 hours in the absence of the large amount of initially formed hydrogen.

Example 2 under conditions similar to those of Example 1 shows that only 28 percent yield of sodium azide was obtained at the time of withdrawal of hydrogen (after ½ hour) and demonstrates that the higher yield of Example 1 was the result of further azide forming reaction subsequent to the hydrogen withdrawal.

Example 3 under conditions similar to those of Examples 1 and 2 except for the initial hydrogen withdrawal after 1.8 hours shows a yield of azide product the same as that of Example 2 obtained after ½ hour, and demonstrates that the additional azide forming reaction of Example 1 was made possible only by the withdrawal of the initially formed hydrogen.

The examples demonstrate the adverse effect on azide product yield of the presence of hydrogen in the system, and that by withdrawal of hydrogen from the system during reaction, higher yields of azide can be obtained.

The examples differ among themselves particularly with reference to temperature. However, those differences are of such small degree as to affect azide product yield only to a minor extent and do not substantially alter the effect of the presence of hydrogen on azide product yield.

I have found that when reacting ammonia, nitrous oxide and alkali metal in a single step, in accordance with this invention, the product yield is increased as a function of the degree of hydrogen removal from the reaction zone during the reaction. When withdrawing hydrogen as soon as it is formed, azide product is formed in substantially quantitative yield. When withdrawal of hydrogen is periodic, somewhat less increase in product yield occurs, and particularly so at temperatures in the order of 80° C. or higher. Other variables, which affect the degree of increase in azide product yield when hydrogen is withdrawn from the reaction zone during a portion of the reaction period, include ratio of alkali metal to ammonia, time of retention of hydrogen in the reaction zone and the degree of efficiency of temperature control.

It is therefore important in the practice of this invention that for maximum increase in yield of alkali metal azide produce, hydrogen is withdrawn from the reaction zone immediately as it is formed under which conditions yields up to as high as a maximum of about 50 mol percent can be achieved.

I am not certain as to why the removal of hydrogen from the system during reaction causes marked increase in azide product yield, which increase is up to substantially 100 percent above that obtained heretofore in one-step operation wherein off-gases are not vented from the system until after the reaction is completed. However, I have found that more hydrogen is formed in the one-step ammonia-alkali metal-nitrous oxide than has been heretofore appreciated and that apparently it enters into side reactions adversely affecting product yield. It is my belief that hydrogen retained in the reaction zone undergoes reaction with nitrous oxide to form nitrogen and water and that the water thus formed reacts with free alkali metal to form alkali metal hydroxide, the loss of alkali metal to the hydroxide resulting of course in corresponding lowered alkali metal azide yield.

The overall reaction of the process of my invention proceeds in accordance with the following equation, which on basis of the alkali metal, provides a maximum yield of 50 mol percent:

$$2Na + N_2O + NH_3 \rightarrow NaN_3 + NaOH + H_2$$

On the other hand the one-step overall reaction of the prior art, wherein no hydrogen withdrawal is carried out, proceeds in accordance with the following equation, which provides a maximum yield of 25 mol percent based on the alkali metal:

$$4Na + 3N_2O + NH_3 \rightarrow NaN_3 + 3NaOH + 2N_2$$

Temperatures over a broad range can be employed in the practice of this invention, preferably over a range of from −40° C. to 130° C. However, at temperatures above say about 80° C., there is somewhat less improved product yield, the relatively higher temperature apparently accelerating the side reaction of hydrogen above discussed. However, in those cases wherein hydrogen withdrawal is substantially continuous, the adverse effect of higher temperature is at a minimum, and, in some instances, substantially nil. I prefer, therefore, to employ a temperature in a range of about 0 to 80° C., a temperature below about 40° C. being often advantageously employed.

The reaction of my process involves direct formation of the azide without there being an intermediate alkali metal amide route. I am not certain as to the mechanism through which the azide-forming reaction of my invention proceeds. However, it is my belief that ammonia enters into the reaction through formation of an anion in accordance with the following equations.

(1) $Na + xNH_3 \rightarrow \overset{+}{Na} + [(NH_3)_x]^{\ominus}$
Solvated Ion
(2) $[(NH_3)_x]^{\ominus} + N_2O \rightarrow HN_3 + H_2O$
(3) $H_2O + Na \rightarrow NaOH + \tfrac{1}{2}H_2$
(4) $\underline{NaOH + HN_3 \rightarrow NaN_3 + H_2O}$
$2Na + NH_3 + N_2O \rightarrow NaN_3 + NaOH + H_2$ Free amide ion is not formed as evidenced by the absence from the reaction mixture of insoluble sodium amide.

The reaction is highly exothermic, and it is important to employ precautions for maintaining uniform temperature throughout the system. Thus, with poor agitation, hot spots develop to cause accelerated reaction between hydrogen and nitrous oxide to give nitrogen and water together with alkali metal hydroxide formation at the expense of azide product yield.

Reaction time is much lower in accordance with this invention than has been practiced in the prior art. Generally with temperature control to within a plus or minus 0.5° C., the reaction time is substantially instantaneous, in any event being usually within a range varying from substantially instantaneous up to about 120 seconds. The shorter reaction times favor improved product yields. Although basically my invention is in the concept of withdrawing hydrogen from the reaction system as it is formed, the high conversions obtained are facilitated by short reaction time, relatively low temperatures, and temperature control, when hydrogen withdrawal is not continuous.

Pressures employed are those sufficient to overcome the vapor pressure of ammonia at reaction temperature. Pressures up to 1000 p.s.i. or higher if desired can be advantageously utilized.

Ratio of ammonia to alkali metal, on a mole basis, is preferably in the range of about 5:1 to 30:1, a ratio of about 10:1 being now preferred. When employing an ammonia to alkali metal mole ratio below about 5:1, the relatively high concentration of alkali metal results in some acceleration of undesirable side reactions with loss of alkali metal from product yield. Ammonia to alkali metal mole ratios above about 30:1 appear to be of little advantage and are undesirable inasmuch as they result in unduly low production rate.

Liquid ammonia is employed as a solvent for the resulting reaction mixture but also takes part in the reaction and is present in at least equimolar amounts, with reference to nitrous oxide, in order to achieve highest possible azide yield. Any suitable inert solvent, particularly a hydrocarbon solvent, can be employed to form a dispersion of the alkali metal. However, ammonia must be present, and the reaction, in any event, takes place in essentially an ammonia solvent.

Although preparation of the alkali metal azides has been illustrated with reference to sodium as the alkali metal, it is to be understood that potassium, lithium, rubidium, and cesium can also be employed as metal reactants in the practice of this invention to produce corresponding potassium, lithium, rubidium, and cesium azides.

In accordance with a now-preferred embodiment, the process of this invention is carried out on a continuous flow-type basis which is further illustrated with reference to the attached diagrammatic drawing. With reference to the drawing, metallic alkali metal, referred to hereinafter in terms of sodium, and liquid ammonia are introduced into reactor 10 in any suitable manner, preferably as a solution of sodium in ammonia in an ammonia to sodium mole ratio of about 10:1, via line 11. In initiating the process, the reactor is charged with the solution to a predetermined level "a," say to about one-half full, subsequent to which gaseous nitrous oxide is introduced into a lower portion of the solution in reactor 10, preferably via line 12. Pressure in reactor 10 is sufficiently high as to maintain ammonia therein as a liquid. The initial temperature in reactor 10, such as any temperature within the ranges described herein, is preferably room temperature or lower, say about 20° C. Pressure in chamber 10 under these conditions is generally in the order of about 125 p.s.i. or higher, such as up to about 350 p.s.i. Nitrous oxide gas is then bubbled through the reaction mixture, from line 12, and maintained in reactor 10 at a partial pressure of say about 1 to 2 atmospheres, although a higher partial pressure of the nitrous oxide can be employed. The azide-forming reaction, as illustrated with reference to the Equation 1 hereinabove, is highly exothermic and requires efficient temperature control, which is greatly facilitated by efficient agitation. Agitation is accomplished in reactor 10 by a suitable stirrer device comprising stir rod 13 and propeller 14 operated by a power source 15.

Vapors comprising nitrous oxide, hydrogen and ammonia are passed from solution 9 in the reaction zone as a constantly flowing stream into reflux chamber 17, containing cooling liquid passed through internal coil 18, resulting condensed vapors being thereby returned to reaction mixture 9 to provide the necessary cooling for effecting satisfactory temperature control. When employing preferred conditions, namely an ammonia to sodium mole ratio of 10:1, a partial pressure of nitrous oxide of from 1 to 2 atmospheres and a temperature of about 20° C., vapors entering reflux chamber 18 from the reaction zone contain unreacted nitrous oxide, ammonia and hydrogen. The amount of cooling required is that for causing condensation of substantially all ammonia entering chamber 18 under which conditions most of the unreacted nitrous oxide is condensed. Uncondensed vapors, largely hydrogen, pass from chamber 17 by way of line 19 and contain substantially all hydrogen formed in the reaction.

Pressure is regulated in reactor 10 by any suitable pressure control system, for example, a conventional back pressure control valve 21. Total liquid effluent is continuously withdrawn from chamber 10 by way of line 22 to product recovery zone 23, constituting conventional product separation equipment including evaporators, fractionators, driers, filters and the like, from which alkali metal azide product is withdrawn via line 24, residual ammonia is withdrawn via line 26, any unreacted metallic reactant is withdrawn via line 27, generally as a slurry in amomnia, the material from lines 26 and 27 being returned to reactor 10 via line 28. Residual nitrous oxide is withdrawn from recovery zone 23 via line 29 and returned to reactor 10 with fresh nitrous oxide via line 12. Hydrogen and nitrous oxide are passed by lines 31 and 32 from valve 21 to a suitable vapor product recovery step 33 for separation of nitrous oxide for return to chamber 10 via line 34 or for separate recovery via line 36. If desired, total vapor from valve 21 can be passed via lines 31 and 37 to any suitable utilization thereof.

When carrying out the process of my invention on a continuous flow-type basis, as illustrated with reference to the drawing, hydrogen withdrawal is continuous and retention time of hydrogen in the reaction zone is, therefore, very low, say a matter of seconds. In such continuous flow operation there is substantially no opportunity for undesirable side reactions, that are believed to occur, which involve hydrogen and alkali metal with concomitantly impaired alkali metal azide product yield. In any event, when hydrogen retention is in the order of that characteristic of continuous flow operation, as illustrated, substantially quantitative (50 percent) yield of alkali metal azide product can be obtained.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. In a process utilizing a one-step reaction for producing an alkali metal azide from liquid ammonia, an alkali metal and nitrous oxide, the improvement comprising contacting a mixture of said liquid ammonia and said alkali metal with said nitrous oxide prior to any formation of alkali metal amide as result of reaction of said alkali metal and said ammonia, whereby hydrogen is formed as by-product, and during the source of the azide-forming reaction, removing hydrogen from contact with the resulting reaction mixture.

2. A process of claim 1 wherein said contacting of said liquid ammonia, nitrous oxide and alkali metal is conducted at a temperature of from −40 to 130° C., and the mole ratio of said liquid ammonia to said alkali metal is within the range of from 5:1 to 30:1.

3. A process of claim 2 wherein the said alkali metal is sodium and said temperature is within the range of 0 to 80° C.

4. A process of claim 3 wherein said hydrogen by-product is continuously withdrawn from said contact with the resulting reaction mixture as a component of an off-gas stream.

5. A process of claim 4 wherein the temperature of said reaction mixture is controlled by refluxing a portion of the said off-gas therefrom and returning resulting condensate to the said reaction mixture.

6. In a process of claim 2, continuously passing said liquid ammonia, said alkali metal and said nitrous oxide into the zone of said contacting and maintaining the resulting azide-forming reaction mixture at a temperature within the range of from 0–80° C.; said hydrogen being formed as said by-product together wtih nitrogen, nitrous oxide and ammonia as a gas mixture, and continuously withdrawing gas mixture thus formed from contact with the said azide-forming reaction mixture; continuously withdrawing total liquid from the said azide-forming reaction mixture; and recovering alkali metal azide from the liquid, thus withdrawn, as product of the process.

7. A process of claim 6 wherein the time and temperature of the said azide-forming reaction are respectively within the range of from substantially instantaneous up to about 120 seconds and from 0–40° C.

8. A process of claim 6 wherein said metal is sodium and said product is thereby sodium azide, and the temperature of the resulting azide-forming reaction mixture is within the range of from 0–40° C.

9. A process of claim 1 wherein said nitrous oxide is passed through a body of solution of said alkali metal in ammonia and said hydrogen is withdrawn from the reaction zone with residual nitrous oxide.

10. A process of claim 9 wherein said alkali metal is sodium, and the temperature of the resulting azide-forming recaiton mixture is from 0–40° C.

11. A process of claim 6 wherein said ammonia and alkali metal are introduced into the zone of said contacting as a solution of alkali metal in said ammonia, said nitrous oxide is introduced into a lower portion of said solution, and the said azide-forming reaction mixture maintained under a pressure below about 350 p.s.i.

12. A process of claim 6 wherein the resulting azide-forming reaction mixture is continuously stirred to effect a predetermined degree of agitation to maintain efficient control of said temperature.

13. A process of claim 6 wherein unreacted ammonia and unreacted nitrous oxide are recovered from total liquid withdrawn from the said contacting zone and then recycled to said zone.

14. A process of claim 13 wherein unreacted nitrous oxide is recovered from the said gas withdrawn from said contact with the azide-forming reaction mixture and then recycled to said contacting zone.

References Cited in the file of this patent
UNITED STATES PATENTS 1,923,993     Meissner _____ Aug. 22, 1933
2,373,800     Acken et al. _____ Apr. 17, 1945

OTHER REFERENCES

Mellor: "Comprehensive Treatise on Inorganic and Theoretical Chemistry," vol. 8, page 345.